US008783950B2

(12) United States Patent
Hagino

(10) Patent No.: US 8,783,950 B2
(45) Date of Patent: Jul. 22, 2014

(54) PACKAGING BODY AND FILM MADE OF RESIN USED THEREFOR

(75) Inventor: Junichi Hagino, Osaka (JP)

(73) Assignee: Packs Co., Ltd., Osaka (JP)

( * ) Notice: Subject to any disclaimer, the term of this patent is extended or adjusted under 35 U.S.C. 154(b) by 1488 days.

(21) Appl. No.: 12/027,463

(22) Filed: Feb. 7, 2008

(65) Prior Publication Data
US 2009/0202183 A1 Aug. 13, 2009

(51) Int. Cl.
*B65D 65/26* (2006.01)
*B32B 9/00* (2006.01)

(52) U.S. Cl.
USPC .......................... 383/211; 428/42.2; 428/354

(58) Field of Classification Search
CPC .............. B65D 75/5855; B65D 33/20; B65D 2575/586; B65D 77/2096; B65D 27/16; B65D 33/1691; B32B 7/06; C09J 2201/28; C09J 2201/36
USPC ......................................... 383/211; 229/80.5
See application file for complete search history.

(56) References Cited

U.S. PATENT DOCUMENTS

| | | | | |
|---|---|---|---|---|
| 2,014,914 A | * | 9/1935 | Teicher | 229/80 |
| 4,785,940 A | | 11/1988 | Wilson | |
| 5,376,392 A | * | 12/1994 | Ikegami et al. | 426/127 |
| 5,445,454 A | * | 8/1995 | Barkhorn | 383/207 |
| 5,902,046 A | * | 5/1999 | Shibata | 383/107 |
| 5,945,145 A | * | 8/1999 | Narsutis et al. | 426/123 |
| 2004/0191459 A1 | * | 9/2004 | Driesten | 428/42.2 |

FOREIGN PATENT DOCUMENTS

JP 8-34448 2/1996

OTHER PUBLICATIONS

Korean Office Action dated Sep. 22, 2009, counterpart of Korean Patent Application No. 10-2007-0106497.

* cited by examiner

*Primary Examiner* — Gary Elkins
*Assistant Examiner* — Christopher Demeree
(74) *Attorney, Agent, or Firm* — Knobbe Martens Olson & Bear LLP

(57) ABSTRACT

Providing a packaging body and a film made of resin (a resin-made film) used therefor that can store the remaining contents even after a part of the contents is taken out, wherein the packaging body is easily openable and closable without providing a zipper, has a storage property equal to that of a body provided with a zipper, and can be manufactured at a low cost.
The resin-made film is constructed with at least an outer layer 6, an inner layer 7, and an adhesive layer 8 in the middle thereof formed by applying an adhesive onto the outer layer 6 and/or the inner layer 7; the adhesive is releasable and re-adherable; and at least a part of the adhesive layer 8 is formed by a combination of an adhesive part 8b where said adhesive is continuously applied and a non-adhesive part 8a where said adhesive is discontinuously applied or a non-adhesive part 8c where the adhesive is not applied.

16 Claims, 9 Drawing Sheets

(A)

(B)

(C)

(A)

(B)

(C)

(A)

(B)

(C)

(A)

(B)

(A)

(B)

(A)

(B)

PACKAGING BODY AND FILM MADE OF RESIN USED THEREFOR

BACKGROUND OF THE INVENTION

1. Field of the Invention

The present invention relates to a packaging body and a film made of resin (a resin-made film) used therefor, and more particularly to a packaging body that can store the remaining contents even after a part of the contents is taken out and resin-made film used therefor.

2. Description of the Related Art

A packaging body made of a sealable resin-made film is widely used as a bag for packaging foods, bags for storing various small articles, and the like. In such a case, a packaging body having a zipper-type mechanism in which the opening part can be easily closed with use of hands after the contents are stored has a high convenience because the performance of storing the remaining contents is good even after a part of the contents is taken out.

Such a packaging body is disclosed, for example, as illustrated in FIG. 9, in Japanese Patent Application Laid-Open (JP-A) No. 08-34448. This packaging body has a rectangular planar shape, and the surroundings are sealed except for the upper part. A convexo-concave zipper is provided on the front and back surfaces of the opening part in the upper part in the width direction. Also, a fracture line for tearing the bag off is formed on the outer circumferential side of the zipper. By breaking this fracture line part, the contents can be taken out via the zipper. After a part of the contents is taken out, the remaining contents can be stored as they are by closing the zipper.

However, with this system, a zipper must be provided in the bag, thereby necessitating an exclusive-use apparatus. This leads to increase in the production costs. The demand for cost reduction of the packaging bodies is strong, so that appearance of a packaging body being easily openable and closable with good storage property and manufacturable at a lower cost is demanded. Specifically, in the production of the bag body 101 for packaging, a composite film is used; a bag product is made by attaching a zipper 103 by a bag producer; a semiautomatic packaging machine or an automatic packaging machine is used; and, while the zipper 103 is being attached to a roll film, the bag is automatically loaded with a product, followed by packaging. The production equipment at this time is special; the adjustment or the like of the machine is very difficult; the production speed is slow; and the loss is extremely great. In order to perform packaging with attachment of the zipper 103, these two processes will be required, so that the packaging in reality is carried out with use of the above-described two kinds of apparatus products.

SUMMARY OF THE INVENTION

Therefore, an object of the present invention is to provide a packaging body and resin-made film used therefor that can store the remaining contents even after a part of the contents is taken out, wherein the packaging body is easily openable and closable without providing a zipper, has a storage property equal to that of a body provided with a zipper, and can be manufactured at a low cost.

The present inventors made extensive study, and as a result they found that the above object can be achieved by the following packaging body and resin made film used therefor, and the present invention was thereby completed.

Namely, the present invention is a packaging body which houses contents in a sealable manner and at least a part of which is constructed with a resin-made film, where an opening part is formed in the resin-made film for taking the contents out, characterized in that; the resin-made film is constructed with at least an outer layer, an inner layer, and an adhesive layer in the middle thereof formed by applying an adhesive onto the outer layer and/or the inner layer; the adhesive is releasable and re-adherable; and at least a part of the adhesive layer is formed by a combination of an adhesive part where said adhesive is continuously applied and a part where said adhesive is discontinuously applied or a part where the adhesive is not applied (these are referred to as "non-adhesive part"), the opening of the opening part formed in said inner layer is possible by peeling said outer layer with said non-adhesive part serving as a base point, and re-sealing of said opening part is possible by re-adhering said outer layer.

When constructed in this manner, by peeling the outer layer of the resin-made film constituting at least a part of the packaging body with the non-adhesive part serving as a starting point, the opening part formed in the inner layer of the resin-made film can be opened, and the contents can be taken out easily. Then, by re-adhering this outer layer, the opening part can be closed by covering of the opening part with the outer layer. Also, when taking the contents out again, by peeling the covering outer layer again, the opening part can be easily opened. As a result of this, a packaging body can be provided which can store the remaining contents even after a part of the contents are taken out, which can be opened and closed easily without providing a zipper, and nevertheless with a storage property being the same as that of the packaging body provided with a zipper, and which can be produced at a low cost. As the packaging body according to the present invention, a packaging body fabricated by superposing resin-made films onto each other and sealing the end parts, a packaging body fabricated by joining a container having an opening and having a predetermined shape with a resin-made film forming the top seal thereof, and others are possible.

Here, the present invention is excellent in that, by fabricating a non-adhesive part serving as a base point in peeling the outer layer beforehand at the end part of the resin-made film, peeling and re-adhering can be made with a simple structure without the need for providing a breakage-facilitating part such as a notch. And, it is of course possible to make the non-adhesive part formed in the adhesive layer be a base point in peeling the outer layer by providing a breakage-facilitating part and breaking this. Also, in re-sealing, instead of sealing only with the outer layer, the opening part can be closed by folding the remaining resin-made film of the opening part and further covering this folded part with the outer layer.

Also, the present invention is characterized by being the said packaging body, where a breakable slit is provided in the inner layer of said resin-made film, and said opening part is formed by the slit.

In opening the packaging body, an opening part must be provided on the inner layer side of the resin-made film where the contents are housed. The resin-made film used for the packaging body can be fabricated by joining the each film constituting at least the inner layer and the outer layer from an original film before forming the layers, and forming a patterned adhesive layer on either of them. At this time, providing a breakable slit in the inner layer and forming the opening part with the slit facilitate opening by peeling the outer layer, and are also advantageous in ensuring the sealing property at the time of re-sealing. Also, it is effective in that one smooth process can be constructed in a step of fabricating the resin-made film.

Also, the packaging body according to the present invention is a packaging body where a rafter part made by superposing the inner layers of said resin-made film onto each other is formed on the front surface of said packaging body; an opening part for taking said contents out is provided at a part of the inner layer of the front surface; and said adhesive layer having said non-adhesive part is formed from said rafter part to the opening so as to facilitate peeling of the outer layer of said front surface, characterized in that;

taking out said contents out from the opening part is made possible by peeling said outer layer from said rafter part to said opening part; and resealing is made possible by re-adhering said outer layer to said inner layer up to said rafter part.

The construction of the packaging body differs depending on the form and the characteristics of the contents. In the present invention, the said technical ideas are applied to the packaging body fabricated by superposing the inner layers of the said resin-made film with each other to form a rafter part. By peeling and re-adhering the outer layer with use of the non-adhesive part formed from the rafter part to the opening part, a part of the contents can be taken out freely while ensuring the storage property even after opening the opening part. At this time, in addition to the seal obtained by covering of the opening part by the outer layer, the seal obtained by close adhesion of the resin-made films constituting the opening part and the seal obtained by pressing of the outer layer onto the opening part can be ensured. Also, it is excellent in that the peeling off and the re-adhesion can be carried out with a simple construction without the need for particularly providing a breakage-facilitating part such as a notch. In addition, there is no need for the operations other than the peeling off and the re-adhesion of the outer layer, thereby providing a high convenience on the side of the user.

Also, in the present packaging body, the contents can be taken out from the opening part by peeling the outer layer, and also re-sealing can be carried out, after folding the rafter part to the side where the outer layer is peeled, by re-adhering the peeled outer layer to the peeled inner layer and adhering the peeled outer layer to the outer layer front surface on the side of the rafter part which is not peeled. At this time, the sealing property can be further strengthened because the pressing onto the opening part can be provided by the folding of the rafter part and further the sealing by the folded part can be formed in addition to the close adhesion at the opening part and the seal by the outer layer.

Further, when the rafter part is formed near the outer peripheral end part of the packaging body, after opening the opening part, re-sealing can be carried out folding the resin-made film with the front and back surface being integrated and further re-adhering the outer layer to the outer layer of the back surface which is folded. At this time, a structure will be provided having a sealing mechanism of two stages by the folded part and the outer layer. At this time, the sealing property can be further strengthened because the pressing onto the opening part can be strengthened by the integral folding of the resin-made film and further the sealing by the folded part can be formed in addition to the close adhesion at the opening part and the seal by the outer layer.

Also, the packaging body according to the present invention is a packaging body made of the said resin-made film that forms a top seal and a container that joins in a sealable manner at the peripheral part and to the end part of the inner layer of the resin-made film, where an opening part for taking the said contents out is provided at a part of the inner layer of the resin-made film, and the said adhesive layer having the said non-adhesive part is formed from the said end part toward the center of the said container, characterized in that;

the said contents can be taken out from the opening part by peeling the said outer layer from the said peripheral part up to the said opening part, and the re-sealing can be carried out by re-adhering the said outer layer to the said inner layer up to the said peripheral part.

As described above, the technical ideas according to the present invention can be applied to a packaging body fabricated by joining a container having an opening part and having a predetermined shape with a resin-made film that forms top seal thereof. Namely, it will have a structure such that the opening part is provided in the inner layer of the resin-made film; the contents can be taken out from the opening part by peeling the outer layer from the peripheral part of the container to the opening part; and re-sealing can be carried out by adhering the outer layer again to the inner layer. Therefore, a packaging body can be provided which can store the remaining contents even after a part of the contents are taken out, which can be opened and closed easily without providing a zipper, and nevertheless with a storage property being the same as that of the packaging body provided with a zipper, and which can be produced at a low cost.

A resin-made film for a packaging body according to the present invention is characterized in that the resin-made film is constructed with at least an outer layer, an inner layer, and an adhesive layer in the middle thereof formed by applying an adhesive onto the outer layer and/or the inner layer; the adhesive is releasable and re-adherable; and at least a part of the adhesive layer is formed by a combination of an adhesive part where said adhesive is continuously applied and a part where said adhesive is discontinuously applied or a part where the adhesive is not applied (these are referred to as "non-adhesive part").

In the packaging body such as described above according to the present invention, functions of easily taking out the contents by opening of the opening part, re-closing of the opening part by covering the opening part, and being capable of repeating this are required. As already described, it is difficult to realize these functions with a simple combination of materials of the resin-made film for packaging bodies and adhesives such as in the prior art. As a result of verification, it has been made possible to realize these functions by constructing a resin-made film made of at least an outer layer, an inner layer, and an adhesive layer, and constructing the adhesive layer with a combination of an adhesive part where the adhesive is continuously applied and a non-adhesive part where the adhesive is discontinuously applied and/or the adhesive is not applied. Namely, for the contradicting functions of the adhesive layer of "facilitating the peeling off" and "ensuring the re-adhesion strength", it has been made possible to set optimum conditions by not only selecting the adhesive but also selecting the pattern of application of the adhesive, the combination of the non-applied parts, and the amount of application thereof. Therefore, it has been made possible to provide a resin-made film used for a packaging body which is easily openable and closable, which nevertheless has a high sealing property, and which can be produced at a low cost. As the resin-made film for a packaging body according to the present invention, in addition to those produced by resin alone such as a later-described OPP (biaxially stretched polypropylene) film or a PET (polyethylene terephthalate) film, a film having aluminum vapor-deposited on the front surface thereof and a film having aluminum foil or the like laminated thereon are included.

The present invention is the resin-made film for the above-described packaging body characterized in that, on said non-adhesive part, a pattern is formed which is obtained by applying an adhesive discontinuously in a straight line form or in a curved line form on the resin-made film.

The non-adhesive part is an important construction for ensuring the functions of "peeling off and re-adhesion of the outer layer". Here, in order to prevent decrease in the peeling function due to excessively large adherability and decrease in the re-adhering function due to excessively small adherability, the amount of application of the adhesive onto the resin-made film and the pattern as well as the verification of the characteristics of the adhesive itself will be important factors. In the present invention, as a result of verification of these, as one effective method, it has been found out that the above-described two functions can be ensured by forming a pattern on which the adhesive is applied discontinuously in a straight line form or in a curved line form, whereby a secure sealing property can be ensured after the re-adhesion with little load imposed upon the user.

The present invention is a resin-made film for the above-described packaging body characterized in that, on said non-adhesive part, a pattern is formed which is obtained by applying an adhesive continuously in a spline form on the resin-made film.

As described above, in order for the non-adhesive part to ensure the peeling function and the re-adhering function of the resin-made film, several patterns have been possible. In the present invention, as one effective method, it has been found out that the above-described two functions can be ensured by forming a pattern on which the adhesive is applied continuously in a spline form, whereby a secure sealing property can be ensured after the re-adhesion with little load imposed upon the user.

The present invention is a resin-made film for the above-described packaging body characterized in that, on said non-adhesive part, a pattern is formed which is obtained by applying an adhesive in a lattice form on the resin-made film in such a manner that one can arbitrarily set the inter-lattice distance or the thickness of the lattice.

As a further effective method in order for the non-adhesive part to ensure the peeling function and the re-adhering function of the resin-made film, it has been found out that the above-described two functions can be ensured by forming a pattern on which the adhesive is applied in a lattice form in such a manner that one can arbitrarily set the inter-lattice distance or the thickness of the lattice, whereby a secure sealing property can be ensured after the re-adhesion with little load imposed upon the user.

Figure 1:
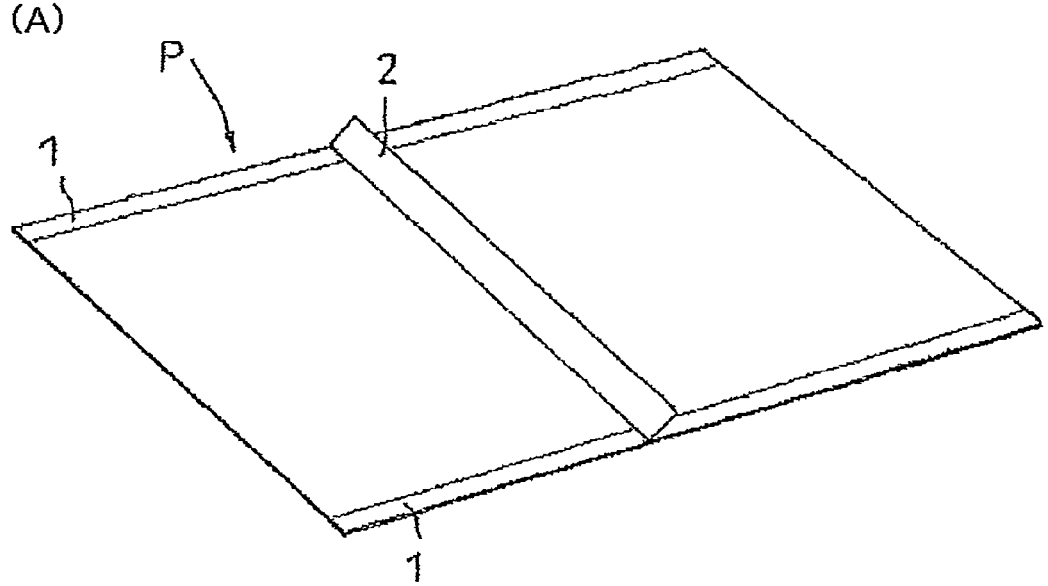
FIG. 1 is an explanatory drawing for illustrating one of the fundamental construction of the packaging body according to the present invention.
Figure 1:
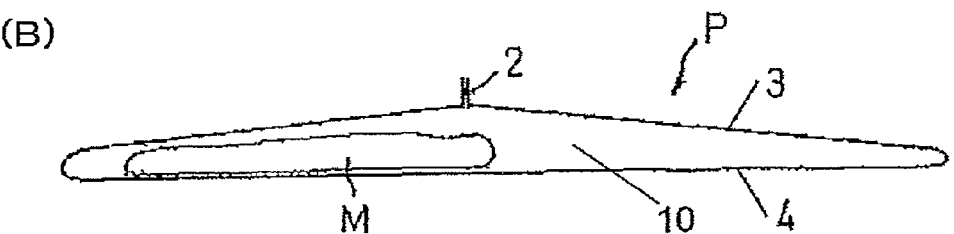
Figure 1:
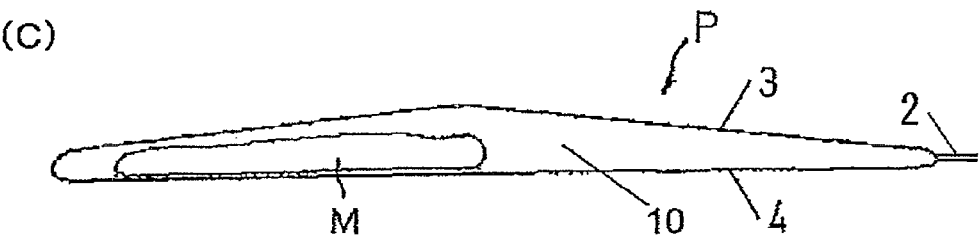

In the drawings, 1 is a sealed fringe; 2, a rafter part; 3, a front surface; 4, a back surface; 5, 5B, 5F, an outer layer; 6, 6B, 6F, an inner layer; 7, an aluminum-vapor-deposited surface; 8, an adhesive layer; 8a, non-adhesive parts; 8b, adhesive parts; 8n, a part; 8A-8E, a pattern of non-adhesive parts; 9, a notch; 9a, a fracture line; 10, an inner hollow part; 10a, an opening part; M, contents; P, packaging body; P1, a fine piece; Pc, a peripheral end part; Pf, a resin-made film and Pt, container.

DETAILED DESCRIPTION OF THE INVENTION

Embodiments of the packaging body according to the present invention will be described in detail with reference to the drawings. The packaging body houses contents in a sealable manner, and at least a part thereof is constructed with a resin-made film, and an opening part for taking out the contents is formed in the resin-made film. As specific modes, a packaging body fabricated by superposing resin-made films onto each other and sealing the end parts, a packaging body fabricated by joining a container having an opening and having a predetermined shape with a resin-made film forming the top seal thereof, and others are possible.

Here, in the following description, regarding the packaging body using a resin-made film according to the present invention, a flat bag type and a type using a molded container will be mainly touched upon. However, it goes without saying that the present invention is not limited to this alone, and can be widely applied to standing type (pouches) and others. Also, regarding the sealing method of the resin-made film, a case in which the rafter is formed mainly from a film and the packaging body is fabricated by three-side seal and a case in which the opened peripheral parts of the molded container are joined will be touched upon. However, it goes without saying that the present invention is not limited to this alone, so that a sealing method for various packaging bodies can be applied by other pillow types (longitudinal sealing forms, bag shape having a gazette attached thereto, lateral pillows, and others), the two-side sealing method by a tube film, other three-side and four-side sealing methods, and the like.

<One of the Basic Construction of the Packaging Body According to the Present Invention>

FIGS. 1(A) to 1(C) exemplify a packaging body fabricated by superposing resin-made films onto each other and sealing the end parts (first construction example). As referring to FIG. 1(A), the packaging body P has a rectangular shape in a plan view, where resin-made films having front and back surfaces are thermally welded, and the packaging body has a sealed fringe 1 and a rafter part 2 obtained by superposing the inner layers of the resin-made film onto each other. As referring to FIG. 1(B), contents M can be housed in an inner hollow part 10 between the front surface 3 and the back surface 4 of the resin-made film. Here, the plan view of the packaging body P made of resin is not limited to a rectangular shape, and may be other shapes such as a square shape, an elliptic shape, or a circular shape. On the front surface 3 of the resin-made film, the rafter part 2 can be disposed in an arbitrary manner such as at the end parts exemplified in FIG. 1(C) instead of at the central part.

This packaging body P made of resin can be produced by various methods generally known in the art while being loaded with contents. As an automatic packaging machine, a Vertical Form, Fill and Seal Machine, a Horizontal Form, Fill and Seal Machine, or the like is suitable for use. According to the former, end parts (corresponding to a rafter part 2) are sealed so that the resin will have a tubular form with an inner hollow part 10, and then the lowermost part (corresponding to a lower periphery 1 in FIG. 1(A), for example) is sealed to provide a shape with a bottom, followed by putting the contents (M) thereinto. After completion of putting the contents in, the upper end (corresponding to an upper periphery 1 in FIG. 1(A), for example) is sealed, and a generally central part of the sealed part is laterally cut with a cutter to separate a packaging body made of resin of the lower half and, at the same time, to allow the upper half to have a bottom, and contents are put in. By repeating such an operation, a packaging body made of resin that packages contents can be produced automatically. For the latter, an automatic packaging machine such as S-5000A manufactured by OMORI MACHINERY CO., LTD. can be used, for example.

[Resin-Made Film Used for the Packaging Body According to the Present Invention]

The resin-made film used in the packaging body P is constructed with at least an outer layer, an inner layer, and an adhesive layer in the middle thereof formed by applying an adhesive onto the outer layer and/or the inner layer; the adhesive is peelable and re-adherable; and at least a part of the adhesive layer is formed by a combination of an adhesive part where the adhesive is continuously applied and a part where the adhesive is discontinuously applied or a part where the adhesive is not applied (these are referred to as "non-adhesive parts"). Regarding the number of laminations of the resin-made film, a case of two layers will be hereafter touched upon for the sake of the simplicity of description; however, it goes without saying that the number and the kind (materials and processes) of the layers can be changed in accordance with the usage thereof, and there may be cases in which they are changed.

Figure 2:
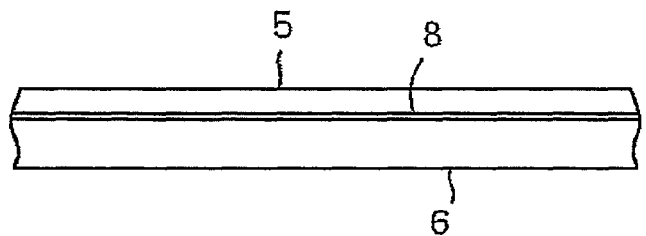
FIG. 2 is an explanatory drawing for exemplifying the patterns of the adhesives layer formed on the film made of resin (resin-made film)
Figure 2:
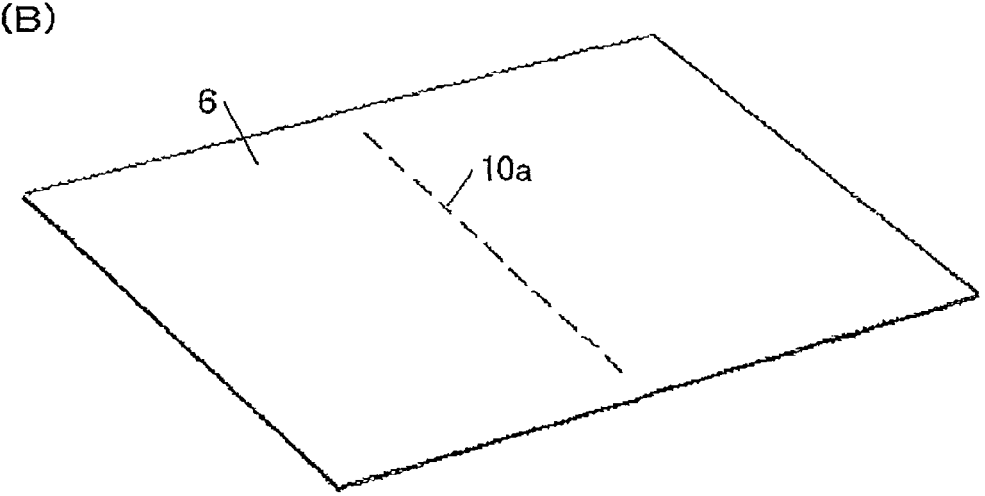
Figure 2:
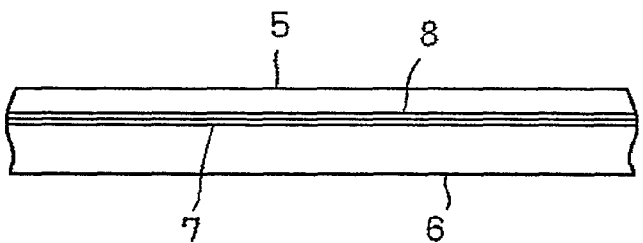

Specifically, as shown in FIG. 2(A), the resin-made film is formed by lamination of an OPP film or a PET film (corresponding to "an outer layer", referred to as an outer layer 5) having a thickness of about 10 to 50 μm and an LLDPE (linear low density polyethylene) film (corresponding to "an inner layer", referred to as an inner layer 6) having a thickness of about 30 to 50 μm. On the back surface side of the outer layer 5 (the side opposing the inner layer 6) or the front surface side of the inner layer 6 (the side opposing the outer layer 5), by printing or the like an adhesive layer 8 that the adhesive is applied at necessary sites as a pattern is formed. Also, in the resin-made film, an opening part 10a for taking the contents M out is provided when the packaging body is fabricated. Specifically, as exemplified in FIG. 2(B), a structure is preferable in which a breakable slit 10a (corresponding to the opening 10a) is provided in the inner layer 6 so that the packaging body can be opened when the outer layer 5 is peeled, and the packaging body can be tightly closed when the outer layer 5 is re-adhered. In a step of fabricating the resin-made film, one smooth process can be constructed by applying an adhesive on the outer layer 5 and attaining a semi-dried state with use of a dryer, forming a slit in the inner layer 6, and bonding the inner layer 6 and the outer layer 5 in a state in which creases are extended. Specifically, the present step can be constructed, for example, at about 140 to 150 m/min to fabricate the resin-made film.

Here, as shown by the enlarged cross-sectional structure in FIG. 2(C), in order to eliminate the influence of the ultraviolet rays and the like on the contents M, the resin-made film can include an example in which the a resin-made film is formed made of a laminate film or the like obtained by laminating the outer layer 5 and the inner layer 6, on which aluminum or the like having a thickness of about 30 to 50 μm is vapor-deposited, with the aluminum-vapor-deposited surface 7 interposed therebetween, and the adhesive layer 8 is formed on the back surface side of the outer layer 5. Also, in the present embodiment, the resin-made film to be used is not limited to the above-described ones, so that it may be a laminate film or the like having a three-layer structure in which a transparent OPP film or a PET film is disposed as an upper surface and an LLDPE film is disposed as a lower surface with a vapor-deposited PET film (VMPET) interposed therebetween. A shielding layer such as a vinylidene chloride film having a high oxygen shielding property may be disposed at the central part of the laminate film. Among the two surfaces of the shielding layer, a nylon (NY) film having a good printing property may be laminated on the foremost surface side. Specifically, PE (polyethylene) film or CPP film, NY 15//PE4O, PET12//PE40, OPP20//PE40 or LLDPE, Barrier-type NY15//LLDPE40, Barrier-type NY15//VMPET12//LLDPE40, Barrier-type NY15//Paper//PE40, NY15//AL7//PE40 or HiCPP60 or the like can be used.

The adhesive layer 8 applied on the outer layer 5 is required the peeling function and the re-adhering function. So the adhesive applied there must be such that peeling off can be carried out by pulling with use of hands using the outer layer 5 as a starting point without the need for a particularly large adhesive strength. Then, it may be such that adhesion can be made repeatedly by pressing the peeled-off resin-made films again onto each other.

The method of applying the adhesive forming the adhesive layer 8 is not particularly limited, so that various bonding techniques that are conventionally known in the art can be applied. Also the method of manufacturing a laminate film can be applied various methods, such as dry laminating, non-solvent laminating, thermal laminating or the like.

Figure 3:
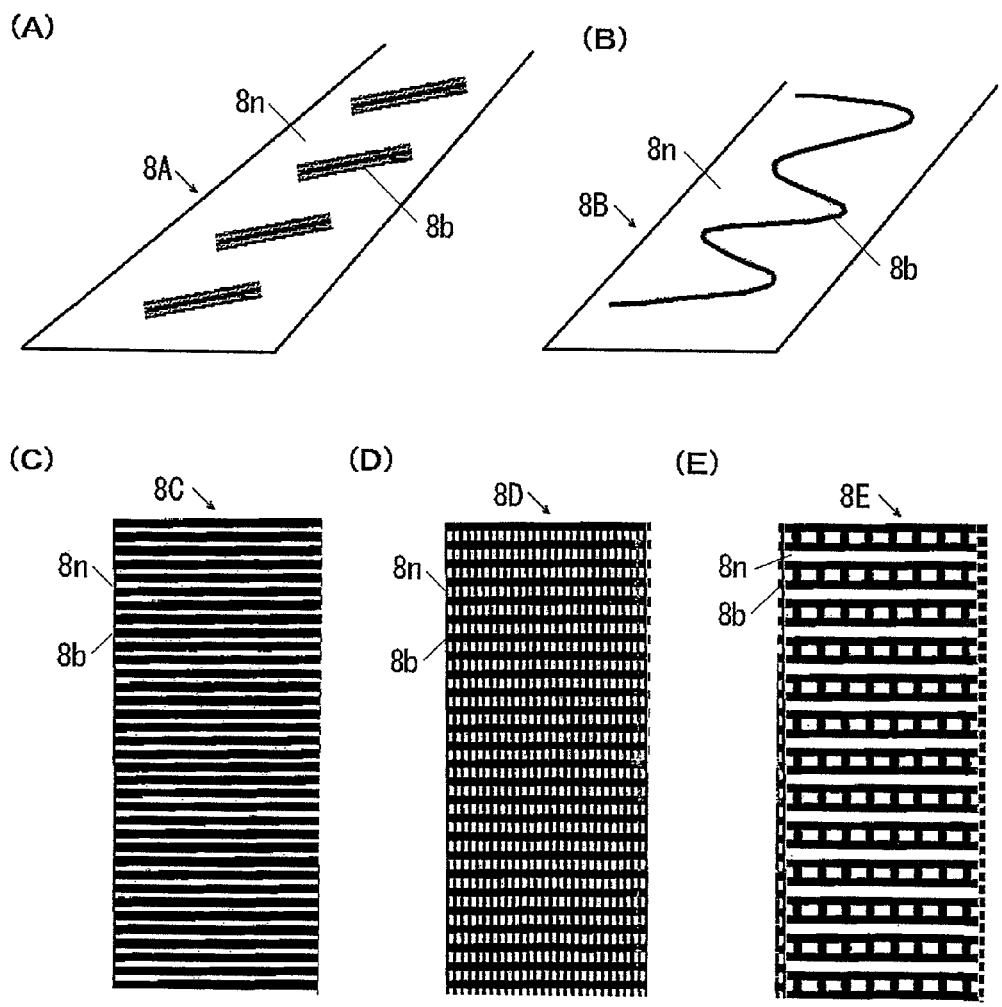
FIG. 3 is an explanatory drawing for exemplifying the patterns of the adhesives layer formed on the resin-made film.

Generally in the formation of the adhesive layer 8 applying the adhesive, the adhesive is applied wholly on the surface. But adhesion and peeling-off of the outer layer 5 of the packaging body P in the present invention are carried repeatedly, so it is preferable that the adhesive layer 8 may formed with not only a part applied the adhesive (adhesive parts 8b) but also non-adhesive parts 8A to 8E (these are referred to as 'non-adhesive parts 8a') forming the combination of adhesive parts exemplified in FIG. 3(A) to 3(E) and a part 8n not applied the adhesive. According to a condition of the size of resin-made film and opening part forming the packaging body P or of the use temperature and the condition of the contents M, the peeling-off and re-adhesion of the outer layer 5 is easy by controlling a material and thickness of the resin film, a kind of the adhesive, a width and height of the adhesive forming non-adhesive parts 8a, or a ratio of the adhesive area per unit area. Then this pattern can be easily made by dry chisel. And the change of the pattern can be comparatively easy, so the voluntary combination of the patterns can be easy. Specifically, FIG. 3(A) shows the pattern 8A of non-adhesive parts 8a applied the adhesive fragmentarily in the straight or curved shape. The strength of adhesion and peeling-off is controlled by the ratio of non-adhesive parts 8a and adhesive parts 8b and the direction of adhesive parts 8b. FIG. 3(B) shows the pattern 8B of non-adhesive parts 8a applied the adhesive continually with form of spline. It has the same function as that of the pattern applied the adhesive fragmentarily above described, and can get the higher strength. FIG. 3(C) shows a pattern 8C of the non-adhesive parts 8a on which an adhesive is applied in a straight line shape and in a wave-like manner. By simply changing the width of the adhesive parts 8a, the adhesion/peeling off strength can be adjusted. FIG. 3(D) shows a pattern 8D of the non-adhesive parts 8a on which the adhesive is applied in a lattice form. By enhancing the adhesion strength relative to the longitudinal direction in addition to the functions of the pattern 8C in the lateral direction relative to the front of the view, the adhesion/peeling off strength having no orientation can be adjusted. Also, by setting the inter-lattice distance or the thickness of the lattice in an arbitrary manner, the adhesion/peeling off strength can be adjusted with a further better precision. FIG. 3(E) shows a pattern 8E of the non-adhesive parts 8a on which the adhesive parts 8b in a lattice form and the part 8n where the adhesive is not applied are alternately formed. While giving priority to the adhesion strength relative to the lateral direction, an intermediate function of the patterns 8C and 8D can be obtained. By setting the inter-lattice distance or the thickness of the lattice in an arbitrary manner, the adhesion/peeling off strength can be adjusted with a further better precision.

Figure 4:
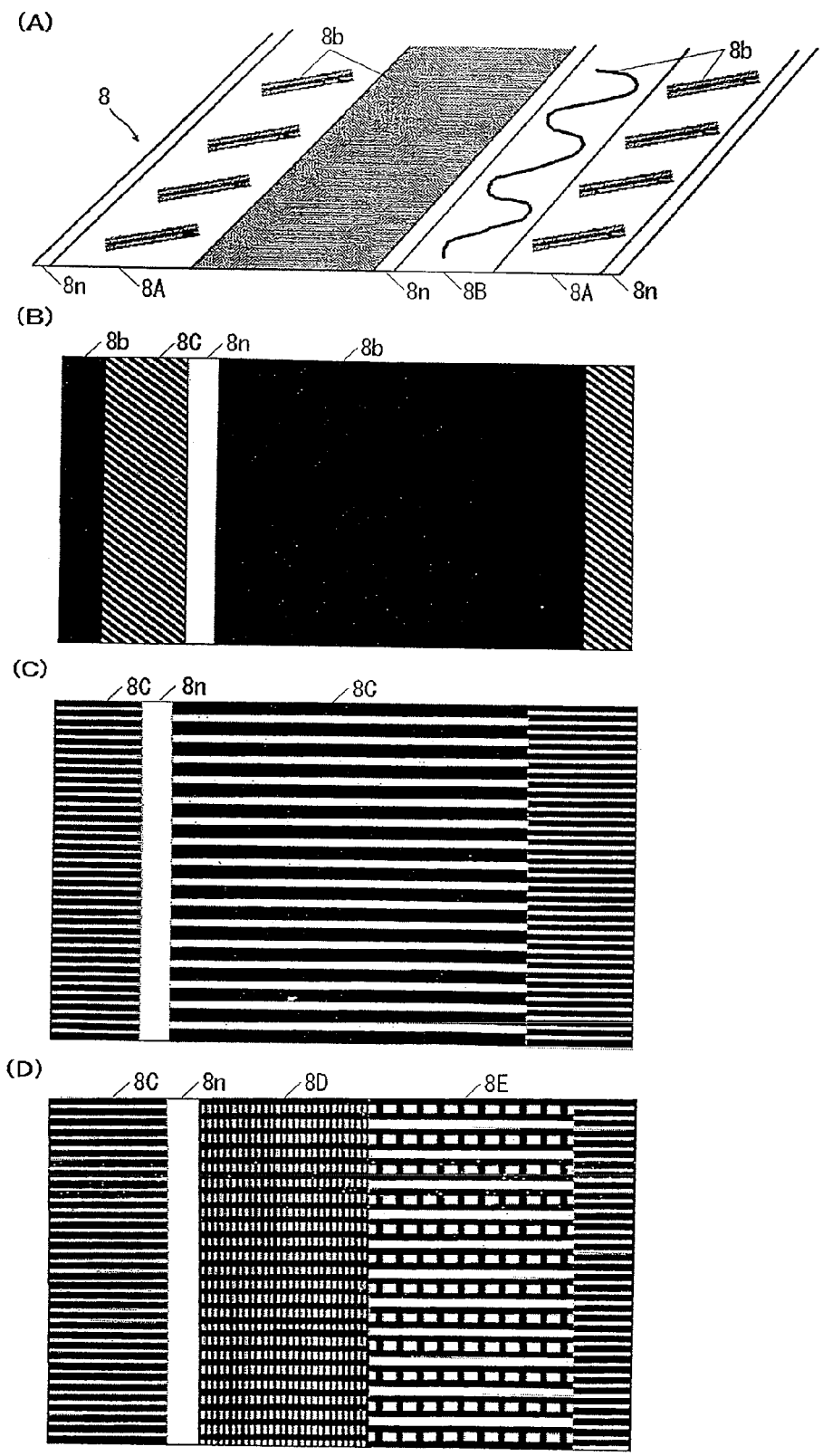
FIG. 4 is an explanatory drawing for exemplifying the adhesive layer formed on the resin-made film.

FIGS. 4(A) to 4(D) exemplify an adhesive layer 8 made by actually combining these patterns. Such an adhesive layer 8 is formed in the resin-made film for a packaging body P, and an adhesive function having a high close adhesion property and a re-adhesion function needed for sealing the once opened packaging body P again can be ensured, and a peeling off function needed for taking the housed contents M out can be ensured. Also, the sealing property from the part of taking the contents M out to the open air, which is a basic function as a packaging body P, can be ensured. Namely, by the adhesive layer 8 having such a pattern, functions of being capable of easily opening and closing while the storage property is not different from that of the bag body provided with a zipper can be ensured without providing a zipper, which is a characteristic feature of the packaging body P of the present invention. Specifically, FIG. 4(A) shows an adhesive layer 8 in which the patterns 8A and 8B are interposed between the adhesive parts 8b and the part 8n where the adhesive is not applied. The part 8n where the adhesive is not applied will be a trigger to the peeling off, and the air ventilation function in the longitudinal direction can be ensured. Also, the strong adhesion function of the adhesive parts 8b and the peeling off/re-adhesion function from the lateral direction by the patterns 8A and 8B can be utilized. FIG. 4(B) shows a case of utilizing the peeling off/re-adhesion function of the pattern 8C instead of the patterns 8A and 8B while forming the adhesive layer 8 similar to that of FIG. 4(A). By obliquely providing the pattern 8C, the peeling off/re-adhesion function from both of the longitudinal and lateral directions and the oblique direction can be utilized. FIG. 4(C) shows an adhesive layer 8 obtained by combining the pattern C with the part 8n where the adhesive is not applied. By changing the width and the interval of the adhesive of the pattern C, the adhesion strength in the longitudinal direction can be adjusted, and the peeling off/re-adhesion function in the lateral direction can be strengthened. FIG. 4(D) shows an adhesive layer 8 in which the patterns 8C to 8E are provided while ensuring the function of the part 8n where the adhesive is not applied. By utilizing the adhesion strength and the peeling off function from both of the longitudinal and lateral directions of the pattern 8D while holding the facility of peeling off from the lateral direction of the patterns 8C and 8E, the peeling off/re-adhesion function from both of the longitudinal and lateral directions of the adhesive layer 8 as a whole can be utilized.

In addition, the adhesive can be not harden at the use temperature by the composition, and then adhesion and peeling-off become easy. Furthermore, the adhesion strength or peeling-off strength can be formed freely by diluting the adhesive. The packing body P of the present invention is superior that the formation of adhesion layer 8 in the outer layer 5 can be set by such processing or the combination of those freely.

As such an adhesive, one can use edible adhesives such as various polysaccharides derived from natural products such as various cereal starches and galactomannan, proteins such as corn protein, albumin, and gelatin, natural gummy substances, shellac, glycerin, and mixtures obtained by suitably blending these. These are applied after being diluted with a denatured alcohol. When such an adhesive is used, the obtained packaging body will be suitable as a bag for packaging foods. Or, in addition to such aforementioned edible adhesives, the adhesives known as a solvent-based adhesive, which are using, for example, an acrylic resin-based or vinyl acetate copolymer-based adhesive and an ethyl acetate-based solvent can be used. In order for the non-adhesive part to ensure the peeling off function and the re-adhesion function of the resin-made film, as a result of the verification of the characteristics of the adhesive itself, the above-described adhesive is suitable; a suitable adhesive force is present; and no adverse effects are produced in a hygienic sense, so that it is particularly suitable as a food packaging body.

[One Embodiment (First Embodiment) Using the Present Packaging Body]

Figure 5:
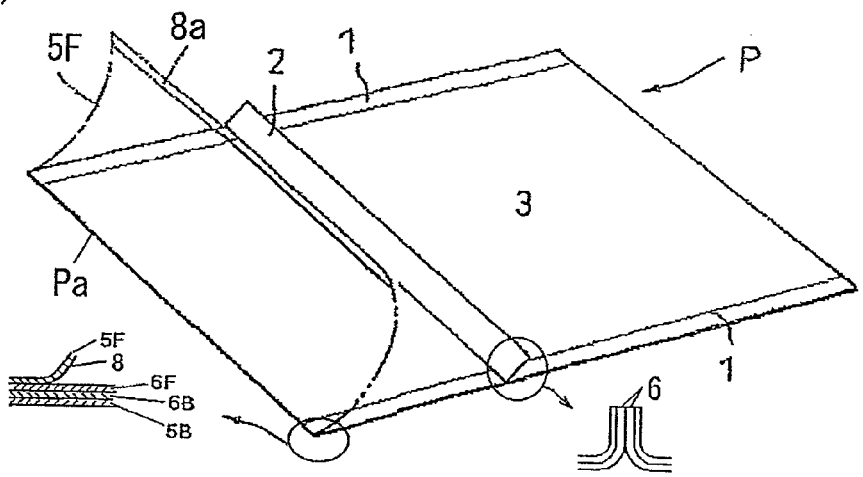
FIG. 5 is an explanatory drawing for exemplifying the first embodiment of the packaging body according to the present invention.
Figure 5:
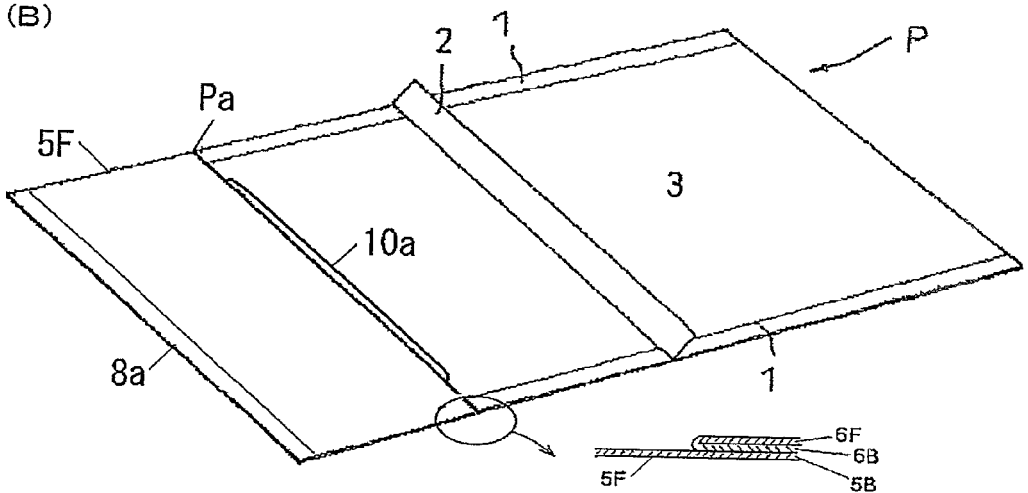
Figure 5:
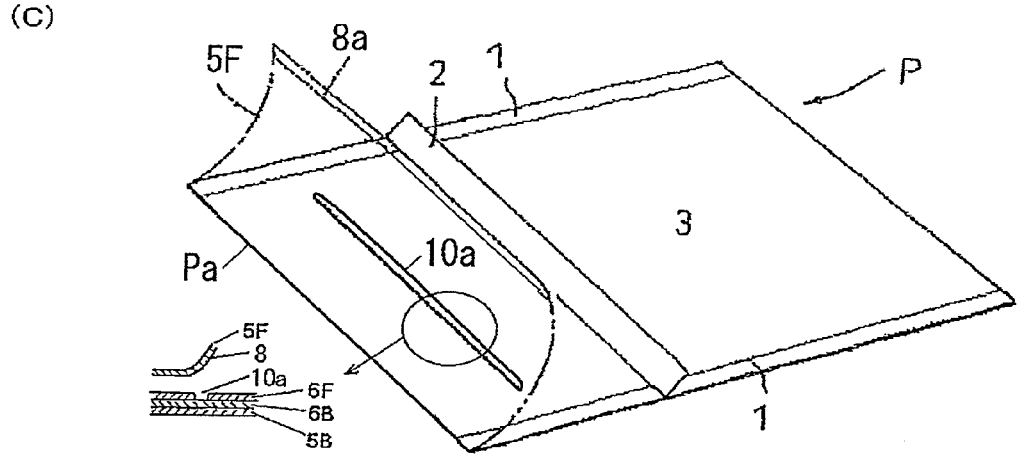

FIGS. 5(A) to 5(C) exemplify one embodiment (first embodiment) of the packaging body according to the present invention. As shown below in FIG. 5(A), on the front surface 3 of the packaging body P, a sealed fringe 1 and a rafter part 2 obtained by superposing the inner layers 6 of the resin-made film with each other are formed. To the left in FIG. 5(A), an enlarged view of the package body P cross-section is shown. The resin-made film of the front surface 3 is made of the outer layer (hereafter referred to as the outer layer 5F) and the inner layer (hereafter referred to as the inner layer 6F) of the front surface 3. The inner layer 6F and the outer layer 5F are sealed at the fringe 1 and the rafter part 2. FIG. 5(A) shows a state in which the outer layer 5F is peeled. An opening part (not illustrated) for taking out the contents M is provided at a part of the inner layer 6F, and an adhesive layer 8 is formed on the outer surface of the inner layer 6F or on the inner surface of the outer layer 5F from the rafter part 2 towards the opening part, thereby facilitating the peeling off of the outer layer 5F. Namely, by peeling the outer layer 5F from the rafter part 2 to the opening part, the contents M can be taken out from the opening part. Also, by re-adhering the outer layer 5F onto the inner layer 6F up to the rafter part 2 after taking out, re-sealing can be carried out.

The position of the rafter part 2 is not limited to those shown in FIGS. 5(A) to 5(C), so that it may be formed on the front surface 3 of the packaging body P. Also, in order to facilitate the peeling off of the outer layer 5F, a notch can be provided in the neighborhood of the end part of the outer layer 5F. The shape and the position of the notch are not particularly limited unless it affects the sealing property of the outer layer 5F.

In the case of taking the whole or a part of the contents M out from the packaging body P that houses the contents M, the outer layer 5F is peeled using the rafter part 2 as a starting point, as shown in FIG. 5(A). At this time, by providing non-adhesive parts 8a at the fractured end part of the outer layer 5F, the peeling off will be further facilitated. The state in which the outer layer 5F is completely peeled is shown in FIG. 5(B). An opening part 10a appears in the neighborhood of the end part Pa of the packaging body P, whereby the contents M can be taken out. However, the position of the opening part 10a is not limited to this alone, so that it may be provided between the rafter part 2 and the end part Pa, as shown in FIG. 5(C). As shown to the left in FIG. 5(C), the opening part 10a provided in a slit form in the inner layer 6F can be opened, without peeling the outer layer 5F completely.

Further, in the case of storing the remaining contents M after a part of the contents M are taken out, in the case of providing a state in which the opening 10a is sealed again, the outer layer 5F is re-adhered to the inner layer 6F up to the rafter part 2 so as to return to FIG. 5(B) (or FIG. 5(C)) to FIG. 5(A). At this time, in order to strengthen the adhesive force, the adhesion area may be further increased. However, when the remaining contents M is small in amount, the sealing can be carried out at the folded part of the resin-made film by turning between the end part Pa and the rafter part 2 without turning at the position of the end part Pa of the original packaging body P.

When a part of the contents M is to be taken out again from the packaging body P, the above-described operation is repeatedly carried out. By doing so, the packaging body can be easily opened and closed without providing a zipper in the packaging body, so that the contents M can be stored in a good condition.

[Another Embodiment (Second Embodiment) Using the Present Packaging Body]

Figure 6:
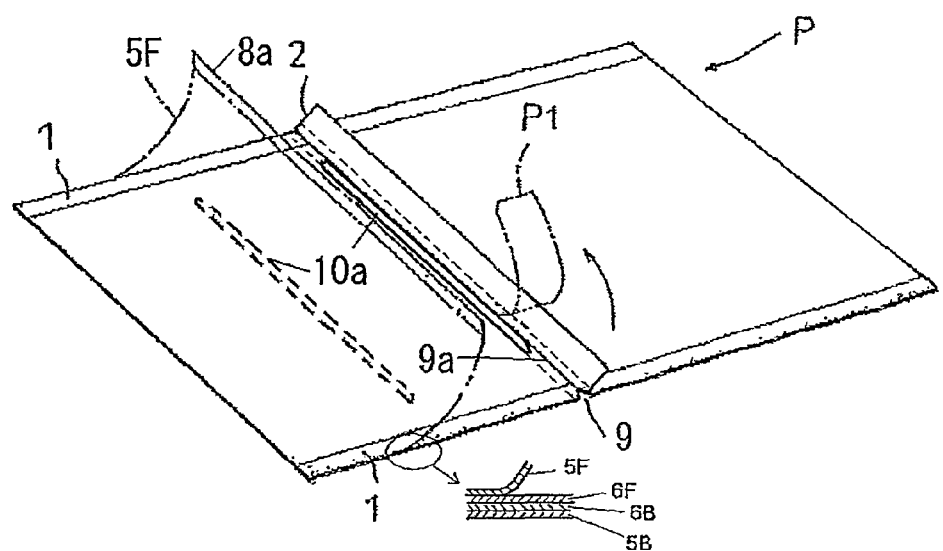
FIG. 6 is an explanatory drawing for exemplifying the second embodiment of the packaging body according to the present invention.
Figure 6:
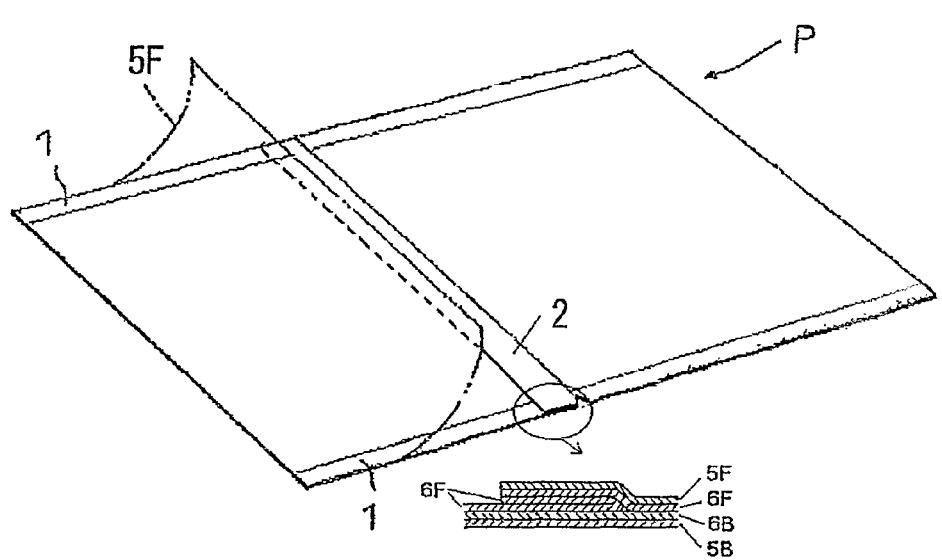

FIGS. 6(A) and 6(B) exemplify another embodiment (second embodiment) of the packaging body according to the present invention. The basic construction is similar to that of the above-described first embodiment; however, the function of the rafter part 2 and the outer layer 5F accompanying the difference of the position of the opening part 10a is different. Also, a case in which a notch is provided in the rafter part 2 is exemplified. Hereafter, the different points will be described, and the common points will be omitted.

As shown in FIG. 6(A), a rafter part 2 is formed on the front surface 3 of the packaging body P, and an opening part notch 9 and a fracture line 9a are disposed in the rafter part 2. FIG. 6(A) shows a state in which the packaging body is opened from the notch 9 and a state in which the outer layer 5F is peeled. The opening part 10a for taking the contents M out is disposed at the fracture line 9a, and an adhesive layer 8 is formed on the outer surface of the inner layer 6F or on the inner surface of the outer layer 5F after the peeling off, from the rafter part 2 towards the opening part 10a, thereby providing a structure facilitating the peeling off of the outer layer 5F. Namely, by opening the opening part and peeling the outer layer 5F from the rafter part 2 up to the opening part 10a, the contents M can be taken out from the opening part 10a. Also, as shown in FIG. 6(B), re-sealing can be carried out by re-adhering the outer layer 5F onto the inner layer 6F up to the rafter part 2 after the rafter part 2 is folded to the peeled outer layer 5F side after taking out. However, the position of the opening part 10a is not limited to this alone, so that it may be disposed between the rafter part 2 and the end part Pa as shown by the broken line in FIG. 6(A).

In the case of taking the whole or a part of the contents M from the packaging body P that houses the contents M, a fine piece P1 is broken, in a part or the whole of the rafter part 2, along the fracture line 9a by using the notch 9 disposed for facilitating the fracture of the packaging body P as a starting point. By this, the outer layer 5F forms a releasable state, so that the outer layer 5F is peeled. At this time, the opening part 10a appears, whereby the contents M can be taken out. Also, by providing non-adhesive parts 8a at the fractured end part of the outer layer 5F, the peeling off will be further facilitated.

Next, in the case of bringing the opening part 10a into a re-sealed state, as shown in FIG. 6(B), after the rafter part 2 is folded to the peeled outer layer 5F side, the outer layer 5F is re-adhered to the inner layer 6F up to the rafter part 2. The folded rafter part 2 provides primary seal of the opening part 10a and, further, the outer layer 5F provides a secondary seal. Therefore, a double sealing function works, thereby enabling re-sealing having a high storage property. Namely, the sealing property can be further strengthened because the pressing onto the opening part 10a can be made by the folding of the rafter part 2 and the seal can be formed by the folded part, in addition to the close adhesion at the opening part 10a and the seal provided by the outer layer 5F.

[Another Embodiment (Third Embodiment) of the Packaging Body According to the Present Invention]

Figure 7:
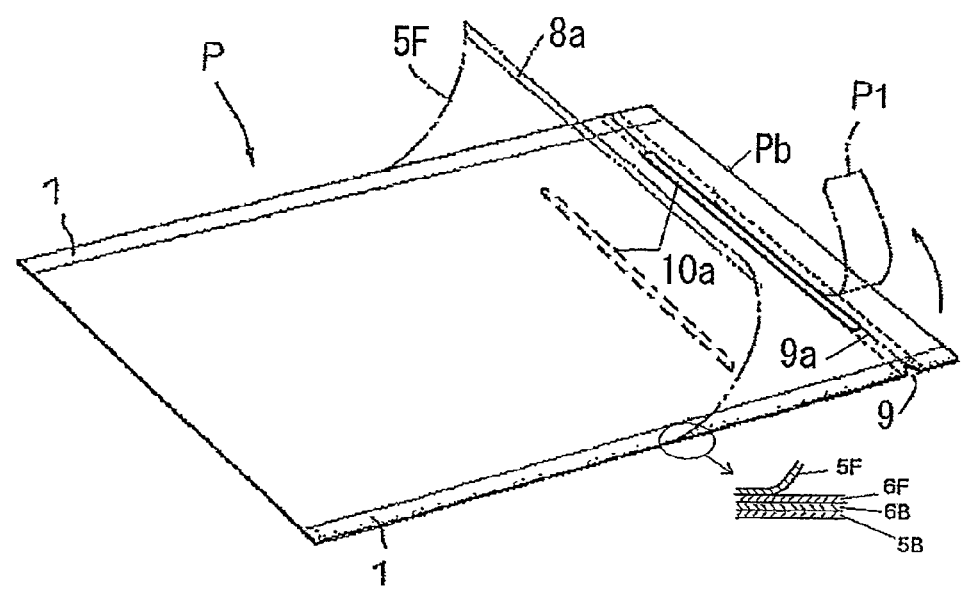
FIG. 7 is an explanatory drawing for exemplifying the third embodiment of the packaging body according to the present invention.
Figure 7:
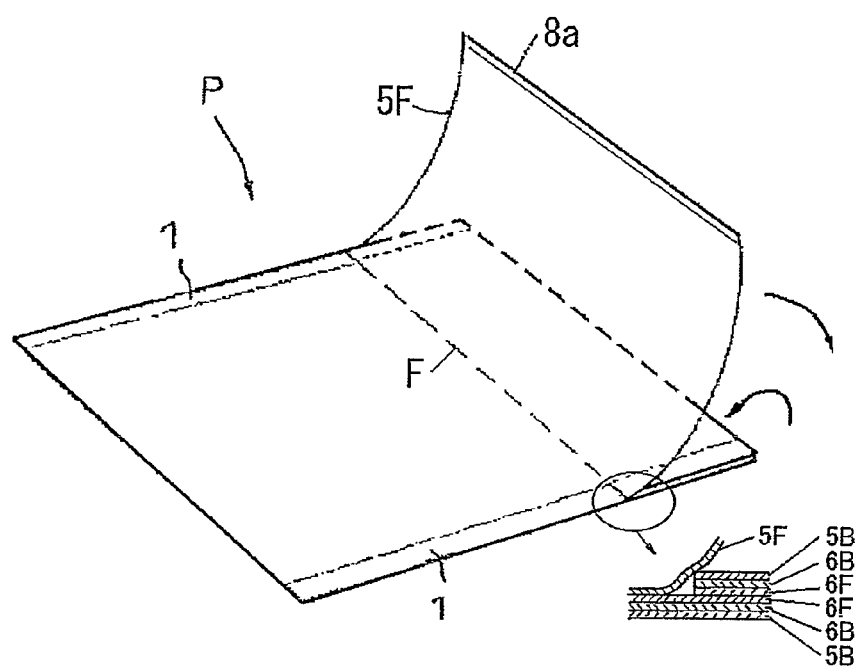

FIGS. 7(A) to 7(C) exemplify another embodiment (third embodiment) of the packaging body according to the present invention. The basic construction is similar to that of the above-described first embodiment; however, it differs in that the position of the rafter part 2 and the position of the folded point which the inner layer 6F and the corresponding resin-made film of the back surface are folded from the opening part 10a to the front surface center part of the packaging body P, and the function of the outer layer 5F accompanying this is different. Hereafter, the different points will be described, and the common points will be omitted.

As illustrated in FIG. 7(A), near the one end part Pb of packaging body P, the rafter part 2 is formed, and at the side peripheries of there, a notch 3 and the fracture line 9a are formed. By breaking a part of the packaging body P using this notch 3 as a starting point, the contents can be taken out. The notch 3 may be formed near the outer circumferential end part. Also, the shape of the notch 3 is not limited to the one shown in FIG. 3, and may be another shape. With this fracture line 9a interposed in between, a non-adhesive part 8a is formed. An adhesive layer 8 is formed on the outer surface of the inner layer 6F or on the inner surface of the peeled outer layer 5F from the rafter part 2 towards the front surface center of the packaging body P, thereby providing a structure facilitating the peeling off of the outer layer 5F. Namely, by opening the opening part, the contents M can be taken out from the opening part 10a, and the outer layer 5F can be peeled. However, the position of the opening part 10a is not limited to this alone, so that it may be provided between the rafter part 2 and the front surface center of the packaging body P as shown by the broken line in FIG. 7(A). Also, as shown in FIG. 7(B), re-sealing can be made by adhering the outer layer 5F onto the back surface outer layer 5B after the inner layer 6F and the corresponding resin-made film of the back surface to the outer layer 5F side where the rafter part 2 is peeled, at the position from the opening part 10a to the packaging body P front surface center part after taking out. At this time, as shown below in FIG. 7(B), by inserting the end part Pa into the joining part F of the peeled outer layer 5F and the inner layer 6F, improvement of the sealing property can be achieved. Namely, the sealing property can be further strengthened because the pressing onto the opening part can be strengthened by integral folding of the resin-made film and the seal can be formed by the folded part in addition to the close adhesion at the opening part and the seal provided by the outer layer.

In the case of taking the whole or a part of the contents M out from the packaging body P that houses the contents, by using the notch 9 shown in FIG. 7(A), only the resin-made film on the front surface that forms the rafter part 2 as a starting point is broken as a fine piece P1 along the fracture line 9a while pulling approximately parallel to the shorter side. By this, the rafter part 2 is broken and the opening part 10a appears, whereby the contents M can be taken out. FIG. 7(A) shows a state in which the outer layer 5F is peeled so as to close again after being already opened. Also, in FIG. 7(A), only the resin-made film on the front surface that forms the rafter part 2 is broken as a fine piece P1; however, the whole of the rafter part 2 can be fractured. In sealing again, the resin-made film constructed with plural layers (outer layers 5F, 5B and inner layers 6F, 6B) is folded at a position different from the opening part 10a, so that a high sealing property can be ensured at the folded part.

In the case of storing the remaining contents in the packaging body P after a part of the contents M are taken out, the opening part 10a is closed again. The method is such that, as shown in FIG. 7(B), the end part of the resin-made film including the opening 10a is folded so as to be inserted between the peeled outer layer 5F and the inner layer 6F, and the outer layer 5F is folded towards the back surface side of the packaging body so as to cover from the above thereof and is pressed onto the back surface of the packaging body P to adhere and close. At this time, in order to strengthen the adhesive force, the adhesion area may be further increased. Namely, by enlarging the folded part and the increasing the adhesion area, the close adhesion degree on the adhesion surface can be strengthened, and also the close adhesion degree of the inner layers with each other constituting the folded part and the opening part 10a can be synergistically raised.

Here, in the above, as the fourth embodiment, a case has been described in which the rafter part 2 and the opening part 10a are formed at the end part of the packaging body P; however, these positions are not limited to this alone, so that when they are located at the front surface of the packaging body P, a structure can be in a similar manner provided having a sealing mechanism of two stages provided by the folded part and the outer layer 5F.

<Another Construction of the Packaging Body According to the Present Invention>

Figure 8:
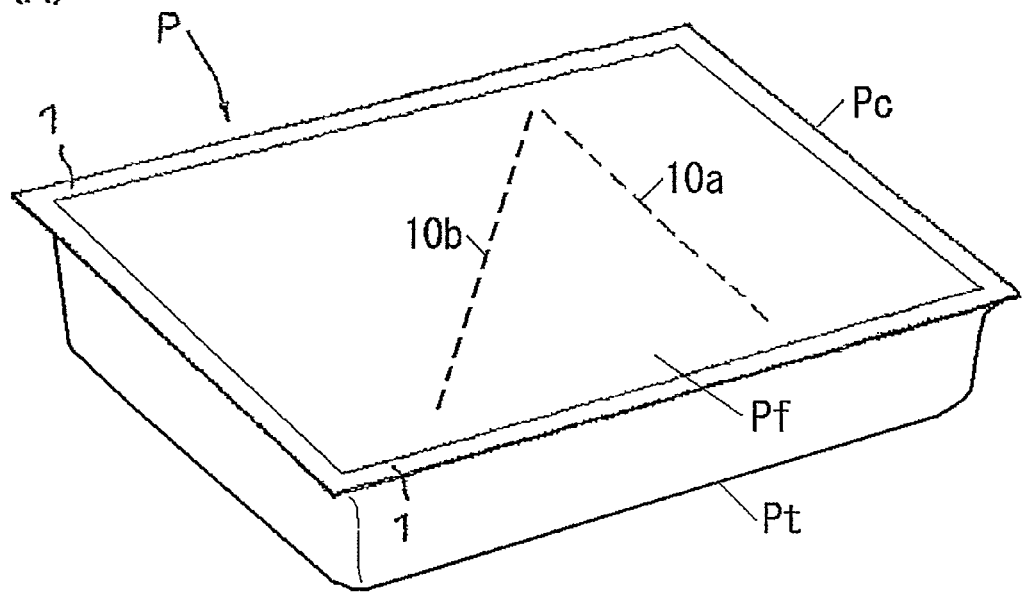
FIG. 8 is an explanatory drawing for illustrating another fundamental construction of the packaging body according to the present invention.
Figure 8:
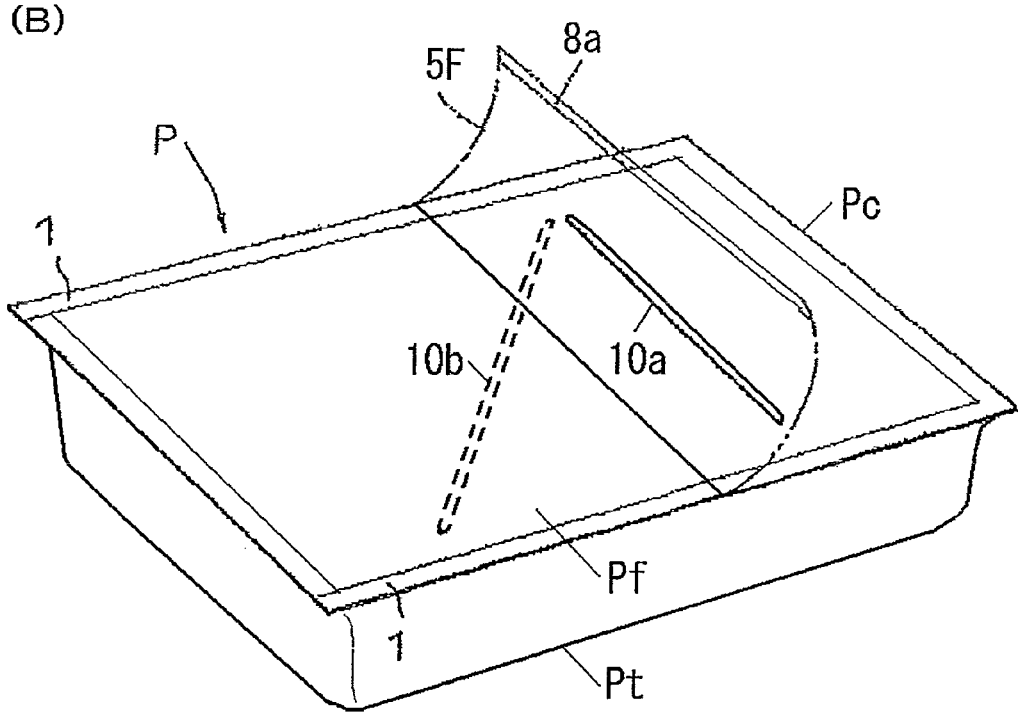
Figure 9:
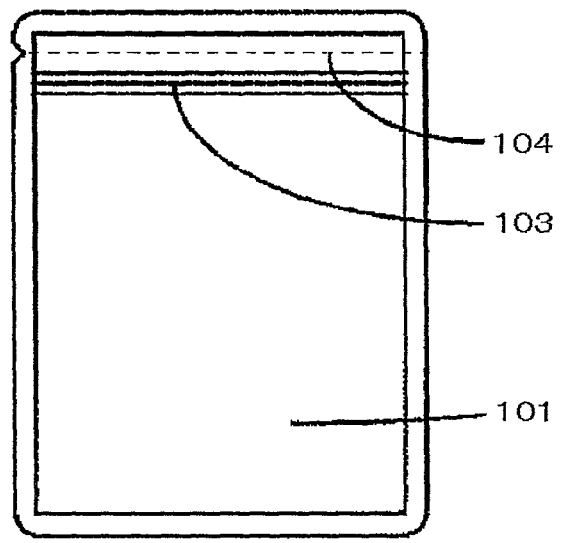
FIG. 9 is an explanatory drawing for illustrating the packaging body according to the prior art.

FIGS. 8(A) and 8(B) exemplify another basic construction of the packaging body according to the present invention (second construction example). The packaging body is made of a resin-made film forming a top seal and a container that joins to the end part of the inner layer of the resin-made film at the peripheral part thereof, where an opening for taking the contents out is provided at a part of the inner layer of the resin-made film, and the said adhesive layer having a non-adhesive part from the end part of the resin-made film towards the center of the container is formed.

Specifically, as shown in FIG. 8(A), regarding the packaging body P made of resin, a resin-made film Pf similar to that of the above-described first construction example is joined to the peripheral end part Pc of the container Pt having an opening whose planar shape is almost rectangular, thereby forming a sealed fringe 1. Here, the shape of the opening of the container Pt is not limited to a rectangular shape, and may be other shapes such as a square shape, an elliptic shape, or a circular shape. Also, the depth and the shape of the container Pt are not particularly limited.

For the container Pt, an opening part 10a for taking the contents M out is provided at a part of the inner layer 6F of the resin-made film Pf, and an adhesive layer 8 is formed on the outer surface of the inner layer 6F or on the inner surface of the peeled outer layer 5F from the peripheral end part Pc towards the opening part 10 am thereby providing a structure in which the outer layer 5F can be easily peeled. Namely, by peeling the outer layer 5F from the peripheral part Pc to the opening part 10a, the contents M can be taken out from the opening part 10a. Also, re-sealing can be made by re-adhering the outer layer 5F onto the inner layer 6F up to the peripheral part Pc.

For the container Pt, a molded product made of the same material as the resin-made film Pf can be used; however, it is not limited to this alone. A container Pt or the like made of metal or fabricated with an inorganic material such as ceramics can be also used, as long as it can join the resin-made film and has an operability and general applicability.

In the case of taking the whole or a part of the contents M out from the packaging body P that houses the contents M, first as shown in FIG. 8(B), the outer layer 5F is peeled using the peripheral end part Pc as a starting point. At this time, by providing non-adhesive parts 8a at the fractured end part of the outer layer 5F, the peeling off will be further facilitated. An opening part 10a appears in the neighborhood of the end part Pa of the packaging body P, whereby the contents M can be taken out. However, the position of the opening part 10a is not limited to this alone, so that it may be provided at the center of the resin-made film Pf, like the opening part 10b shown in FIG. 5(B). By peeling the outer layer 5F while leaving one end of the peripheral end part Pc, the contents M as a whole can be easily taken out.

Also, in the case of bringing the opening part 10a into a sealed state again after a part of the contents M are taken out, the outer layer 5F is re-adhered onto the inner layer 6F up to the peripheral end part Pc so as to return to the state shown in FIG. 8(A). At this time, in order to strengthen the adhesive force, the adhesion area may be further increased.

In the case of taking out a part of the contents M out from the packaging body P again, the above-described operations are repeatedly carried out. By doing in this manner, the packaging body P can be easily opened and closed without providing a zipper in the packaging body P, whereby the contents M can be stored in a preferable state.

What is claimed is:

1. A packaging body which houses contents in a sealable manner comprising:
   a film made of resin (a resin-made film), and
   an opening part formed in the resin-made film for taking the contents out,
   wherein the resin-made film comprises an outer layer, an inner layer, and an adhesive layer in the middle thereof formed by applying an adhesive onto the outer layer or the inner layer so as to form predetermined patterns or combination of the predetermined patterns with an adhesive part where said adhesive is continuously applied and a non-adhesive part where said adhesive is discontinuously applied or not applied, such that a resealing part is formed where said adhesive is applied to the outer or inner layer,
   wherein the predetermined patterns comprise:
   a first adhesive part comprising a first pattern of adhesive;
   a second adhesive part comprising a second pattern of adhesive, wherein said second pattern comprises a different ratio of adhesive covering to non-adhesive covering and/or a different orientation of adhesive strength than said first adhesive part, such that the first adhesive part and the second adhesive part form areas of different adhesive strengths within said resealing part; and
   a non-adhesive part where adhesive is not applied between said first and second adhesive parts, wherein the first pattern and the second pattern do not overlap with each other when the outer layer is re-sealed, and
   the predetermined patterns are to provide a desired strength of adhesion and peeling off, whereby the opening part formed in said inner layer is accessible by peeling said outer layer with said non-adhesive part serving as a base point, and is re-sealed by re-adhering said outer layer.

2. The packaging body according to claim 1, wherein a breakable slit is provided in the inner layer of said resin-made film as the opening part, wherein the slit is accessible by peeling the outer layer with said non-adhesive part serving as a base point, and the opening part is re-sealed by re-adhering the outer layer.

3. The packaging body according to claim 2, further comprising a rafter part formed by superposing the inner layers of said resin-made film onto each other, said rafter is formed on the front surface of said packaging body,
wherein the opening part for taking said contents out is provided at a part of the inner layer of the front surface;
and said adhesive layer having said non-adhesive part is formed from said rafter part to the opening so as to facilitate peeling of the outer layer of said front surface, whereby said contents out from the opening part by peeling said outer layer from said rafter part to said opening part and the opening is re-sealed by re-adhering said outer layer to said inner layer up to said rafter part.

4. The packaging body according to claim 3, wherein said rafter part is formed near the one end part of packaging body 5. A method to open and re-seal the packaging body according to claim 4 comprising:
peeling the outer layer from the rafter part toward the opening;
exposing the opening part to take the contents out/in,
folding the peeled portion such that the exposed inner layer is facing each other across the folding line; and
re-adhering the outer layer over the folded portion.

6. The packaging body according to claim 2, comprising:
a top seal comprises the film made of resin (a resin-made film); and
a container, the peripheral part of which is joined in a sealable manner with the end part of the inner layer of the resin-made film,
wherein the opening part for taking the said contents out is provided at a part of the inner layer of the resin-made film, and the adhesive layer comprises the non-adhesive part is formed from the end part toward the center of the container, the contents can be taken out from the opening part by peeling the outer layer from the peripheral part up to the opening part, and the re-sealing can be carried out by re-adhering the outer layer to the inner layer up to the peripheral part.

7. A method to open and re-seal the packaging body according to claim 2 comprising:
peeling the outer layer from the non-adhesive part;
exposing the opening part to take the contents out/in, and
re-sealing the opening by re-adhering the outer layer onto the inner layer.

8. The packaging body according to claim 1, further comprising a rafter part formed by superposing the inner layers of said resin-made film onto each other, said rafter is formed on the front surface of said packaging body,
wherein the opening part for taking said contents out is provided at a part of the inner layer of the front surface; and
said adhesive layer having said non-adhesive part is formed from said rafter part to the opening so as to facilitate peeling of the outer layer of said front surface, whereby said contents is taken out from the opening part by peeling said outer layer from said rafter part to said opening part and the opening is re-sealed by re-adhering said outer layer to said inner layer up to said rafter part.

9. The packaging body according to claim 8, wherein said rafter part is formed near the one end part of packaging body.

10. A method to open and re-seal the packaging body according to claim 9 comprising:
peeling the outer layer from the rafter part toward the opening;
exposing the opening part to take the contents out/in,
folding the peeled portion such that the exposed inner layer is facing each other across the folding line; and
re-adhering the outer layer over the folded portion.

11. The packaging body according to claim 1, comprising:
a top seal comprises the film made of resin (a resin-made film); and
a container, the peripheral part of which is joined in a sealable manner with the end part of the inner layer of the resin-made film,
wherein the opening part for taking the contents out is provided at a part of the inner layer of the resin-made film, and the adhesive layer comprises the non-adhesive part is formed from the end part toward the center of the container, whereby the contents can be taken out from the opening part by peeling the outer layer from the said peripheral part up to the opening part, and the re-sealing can be carried out by re-adhering the outer layer to the inner layer up to the peripheral part.

12. A method to open and re-seal the packaging body according to claim 1 comprising:
peeling the outer layer from the non-adhesive part;
exposing the opening part to take the contents out/in, and
re-sealing the opening by re-adhering the outer layer onto the inner layer.

13. A resin-made film for a packaging body comprising:
an outer layer,
an inner layer, and
an adhesive layer in the middle thereof formed by partially applying an adhesive onto the outer layer or the inner layer so as to form predetermined patterns or combination of the predetermined patterns with an adhesive part where said adhesive is continuously applied and a non-adhesive part where said adhesive is discontinuously applied or not applied, such that a resealing part is formed where said adhesive is applied to the outer or inner layer,
whereby strength of adhesion and peeling-off are controlled by the patterns or combination of the pattern
wherein the predetermined patterns comprise:
a first adhesive part comprising a first pattern of adhesive;
a second adhesive part comprising a second pattern of adhesive, wherein said second pattern comprises a different ratio of adhesive covering to non-adhesive covering and/or a different orientation of adhesive strength than said first adhesive part, such that the first adhesive part and the second adhesive part form areas of different adhesive strengths within said resealing part; and
a non-adhesive part where adhesive is not applied between said first and second adhesive parts wherein the first pattern and the second pattern do not overlap with each other when the outer layer is re-sealed.

14. The resin-made film for a packaging body according to claim 13, wherein, on said non-adhesive part, a pattern is formed which is obtained by applying an adhesive discontinuously in a straight line form or in a curved line form on the resin-made film.

15. The resin-made film for a packaging body according to claim 13, wherein, on said non-adhesive part, a pattern is formed which is obtained by applying an adhesive continuously in a spline form on the resin-made film.

16. The resin-made film for a packaging body according to claim 13, wherein, on said non-adhesive part, a pattern is formed which is obtained by applying an adhesive in a lattice form on the resin-made film in such a manner that one can arbitrarily set the inter-lattice distance or the thickness of the lattice.

\* \* \* \* \*